(12) United States Patent
Ryu et al.

(10) Patent No.: US 11,560,635 B2
(45) Date of Patent: Jan. 24, 2023

(54) ELECTRODE FOR GAS GENERATION, METHOD OF PREPARING THE ELECTRODE AND DEVICE INCLUDING THE ELECTRODE FOR GAS GENERATION

(71) Applicant: UNIST (ULSAN NATIONAL INSTITUTE OF SCIENCE AND TECHNOLOGY), Ulsan (KR)

(72) Inventors: Jungki Ryu, Ulsan (KR); Dong Woog Lee, Ulsan (KR); Dasom Jeon, Ulsan (KR); Jinwoo Park, Ulsan (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 630 days.

(21) Appl. No.: 16/579,542

(22) Filed: Sep. 23, 2019

(65) Prior Publication Data
US 2020/0325586 A1    Oct. 15, 2020

(30) Foreign Application Priority Data
Apr. 15, 2019   (KR) .................. 10-2019-0043699

(51) Int. Cl.
| | | |
|---|---|---|
| H01M 4/86 | (2006.01) | |
| H01M 4/88 | (2006.01) | |
| H01M 8/22 | (2006.01) | |
| C25B 11/095 | (2021.01) | |
| C25B 11/031 | (2021.01) | |
| C25B 1/55 | (2021.01) | |
| C25B 11/057 | (2021.01) | |
| C25B 11/051 | (2021.01) | |
| C25B 1/04 | (2021.01) | |

(52) U.S. Cl.
CPC .............. *C25B 11/095* (2021.01); *C25B 1/04* (2013.01); *C25B 1/55* (2021.01); *C25B 11/031* (2021.01); *C25B 11/051* (2021.01); *C25B 11/057* (2021.01); *H01M 4/8605* (2013.01); *H01M 4/8657* (2013.01); *H01M 4/8663* (2013.01); *H01M 4/8892* (2013.01); *H01M 8/222* (2013.01)

(58) Field of Classification Search
CPC .................................................. H01M 4/8605
See application file for complete search history.

(56) References Cited

U.S. PATENT DOCUMENTS

| | | | | |
|---|---|---|---|---|
| 2005/0164283 A1* | 7/2005 | Krotz | ..................... | C12Q 1/002 204/450 |
| 2009/0263891 A1* | 10/2009 | Gillies | ............. | G01N 33/54366 435/287.2 |
| 2017/0105832 A1* | 4/2017 | Rosenblum | ............... | C25B 9/73 |

FOREIGN PATENT DOCUMENTS

| | | | |
|---|---|---|---|
| KR | 1017429120000 B1 | | 5/2017 |
| WO | 2017027088 A2 | | 2/2017 |

OTHER PUBLICATIONS

Records, William C. et al., "Virus-templated Pt—Ni(OH)h nanonetworks for enhanced electrocatalytic reduction of water", Nano Energy 58, 2019, pp. 167-174.

(Continued)

*Primary Examiner* — Brian R Ohara
(74) *Attorney, Agent, or Firm* — Dorsey & Whitney LLP

(57) ABSTRACT

Disclosed are an electrode for gas generation, a method of preparing the electrode, and a device including the electrode for gas generation. The electrode includes a gas generating electrode layer and a three-dimensional (3D) super-aerophobic layer formed on at least one portion of the gas generating electrode layer and including porous hydrogel.

9 Claims, 14 Drawing Sheets

(56) References Cited

OTHER PUBLICATIONS

Chen et al., "Assembly of Viral Hydrogels for Three-Dimensional Conducting Nanocomposites," Adv. Mater., (2014), 26(30):5101-5107, DOI:10.1002/adma/201400828.
Oh et al., "Biologically enhanced cathode design for improved capacity and cycle life for lithium-oxygen batteries," Nature Communications, (2013), 4:2756, DOI: 10/1038/ncomms2756, www.nature.com/naturecommunications, 8 pages.

* cited by examiner

ELECTRODE FOR GAS GENERATION, METHOD OF PREPARING THE ELECTRODE AND DEVICE INCLUDING THE ELECTRODE FOR GAS GENERATION

CROSS-REFERENCE TO RELATED APPLICATION(S)

This application claims the benefit of priority of Korean Patent Application No. 10-2019-0043699 filed 15 Apr. 2019 in the Korean Intellectual Property Office, the disclosure of which is incorporated herein by reference for all purposes.

BACKGROUND

1. Field

One or more example embodiments relate to an electrode for gas generation, a method of preparing the electrode, and a device including the electrode for gas generation.

2. Description of Related Art

Electrochemical or photoelectrochemical water splitting is one of effective methods to generate hydrogen energy in an environmentally friendly way using electricity from conventional and renewable energy resources using water that is commonly found on the earth. That is why many researchers have made a great deal of efforts in altering a shape and a structure of an electrode to manufacture an effective electrochemical or photoelectrochemical system, or synthesizing a catalyst and an electrode to increase efficiency of the electrode. Despite such efforts, an amount of gas generated may be relatively small compared to electrochemical or photoelectrochemical energy applied to such a water splitting system. This is because of a characteristic of water splitting that generates a three phase interface of solid, liquid, and gas and the produced gas can adhere onto a surface of an electrode.

The produced gas may adhere to the electrode to reduce a surface area of the electrode and an active site of a gas producing catalysis, thereby reducing overall efficiency. Until recently, methods of controlling a shape and a structure of an electrode itself have been applied to impart a higher level of aerophobicity or hydrophilicity to the electrode to easily detach or remove gas bubbles. However, these methods may involve changing an electrode itself and structuralizing an (photo)electrode multidimensionally, and may have deleterious effect on the efficiency of (photo)electrode by increasing the recombination of photogenerated electron-hole pairs, reducing a reaction activity and stability due to a change in physical and/or chemical characteristic of the electrode itself, and increasing light-scattering due to resultant structures of the (photo)electrodes. In addition, these methods require complex, laborious, and energy-intensive processes, for example, a complex additional process, e.g., a hydrothermal process, that requires a high pressure and/or temperature. Thus, these methods may be difficult to scale up or difficult to apply to a large area or size of the electrode and may be harmful to human body and environment.

SUMMARY

An aspect provides an electrode for gas generation by forming a three-dimensional (3D) super-aerophobic layer including porous hydrogel for an effective gas generation or evolution reaction.

Another aspect also provides a device including an electrode for (photo)electrochemical gas generation.

Still another aspect also provides a method of preparing an electrode for gas generation.

However, aspects or tasks to be achieved by the present disclosure are not limited to the aspects described in the foregoing, and thus other aspects or tasks not described above may also be clearly understood by those skilled in the art from the following description.

According to an example embodiment, there is provided an electrode for gas generation, the electrode including a gas generating electrode layer, and a 3D super-aerophobic layer formed on at least one portion of the gas generating electrode layer and including porous hydrogel.

The gas generating electrode layer may include a transparent electrode layer as well as opaque metallic electrodes, and a catalytic material layer formed on the electrode surface. The catalytic material layer may include at least one catalyst selected from a group consisting of a metal, an oxide, a hydroxide, an oxyhydroxide, a nitride, an oxynitride, a carbide, a sulfide, a phosphide, a phosphate, and an alloy which include at least one selected from a group consisting of Pt, Ti, Sn, Zn, Mn, Mg, Ni, W, Co, Fe, Ba, In, Zr, Cu, Al, Bi, Pb, Ag, Cd, Ga, Y, Mo, Rh, Pd, Sb, Cs, La, V, Si, Al, Sr, B, and C.

The gas generating electrode layer may be a semiconductor substrate. The semiconductor substrate may be a substrate including a p-type or n-type semiconductor material layer, a silicon wafer, or a p-type or n-type semiconductor substrate.

A surface of the at least one portion of the gas generating electrode layer may be treated with alkoxy silane.

The 3D super-aerophobic layer including the porous hydrogel may include polymer-based hydrogel, linear virus-based hydrogel, or both the polymer-based hydrogel and the linear virus-based hydrogel.

A linear virus of the linear virus-based hydrogel may be M13.

The porous hydrogel may include a cross-linked portion in which a polymer, the linear virus, or both the polymer and the linear virus, and a cross-linking agent are cross-linked. The cross-linking agent may include at least one selected from a group consisting of glutaraldehyde, epichlorohydrin (EPC), piperazine diacrylamide, ethyl diethylaminopropyl carbodiimide (EDC), genepin, transglutaminase (TG), formaldehyde, N,N'-methylene-bis-acrylamide, N,N,N',N'-tetramethyl ethylene diamine, ethylene glycol dimethacrylate, glyoxal, acrylic acid, maleic acid (MA), polymaleic acid (PMA), succinic acid (SA), citric acid (CA), phosphoric acid (PA), tetraetoxysilane, boric acid (BA), and ether.

The 3D super-anaerobic layer including the porous hydrogel may be 5 micrometers (μm) to 500 μm thick.

The electrode may be for generating hydrogen, oxygen, nitrogen, or chlorine by an electrochemical or photoelectrochemical decomposition reaction.

According to another example embodiment, there is provided a device including an electrode for gas generation. The electrode may include a gas generating electrode layer, and a 3D super-aerophobic layer formed on at least one portion of the gas generating electrode layer and including porous hydrogel.

The device may be an electrochemical or photoelectrochemical water-splitting cell or fuel cell.

According to still another example embodiment, there is provided a method of preparing an electrode for gas generation, the method including preparing a gas generating electrode layer, and forming a 3D super-aerophobic layer including porous hydrogel on at least one portion of the gas generating electrode layer.

The preparing of the gas generating electrode layer may include preparing a semiconductor substrate, and applying an acid treatment to a surface of the semiconductor substrate.

The preparing of the gas generating electrode layer may include preparing a transparent electrode, and forming a catalytic material layer on the transparent electrode. The catalytic material layer may include a single layer or a plurality of layers.

The method may further include treating a surface of the gas generating electrode layer with alkoxy silane. The treating of the surface with alkoxy silane may include applying a plasma treatment to the surface of the gas generating electrode layer; immersing, in an alkoxy silane solution, the plasma treated gas generating electrode layer, and annealing the electrode obtained after the immersing at a temperature of 100° C. to 300° C.

The forming of the 3D super-aerophobic layer may include forming a coating composition by mixing a polymer, a linear virus, or both the polymer and the linear virus, and a cross-linking agent, and coating the gas generating electrode layer with the coating composition.

The forming of the 3D super-aerophobic layer may include forming a first mixture including a solvent, and the polymer, the linear virus, or both the polymer and the linear virus, forming a second mixture by mixing the first mixture and the cross-linking agent after disposing the first mixture on the gas generating electrode layer, and dispersing the second mixture on the gas generating electrode layer by applying a pressure, a rotational force, or both the pressure and the rotational force.

The polymer, the linear virus, or both the polymer and the linear virus, and the cross-linking agent may be mixed at a weight ratio of 1:0.0001.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1A:
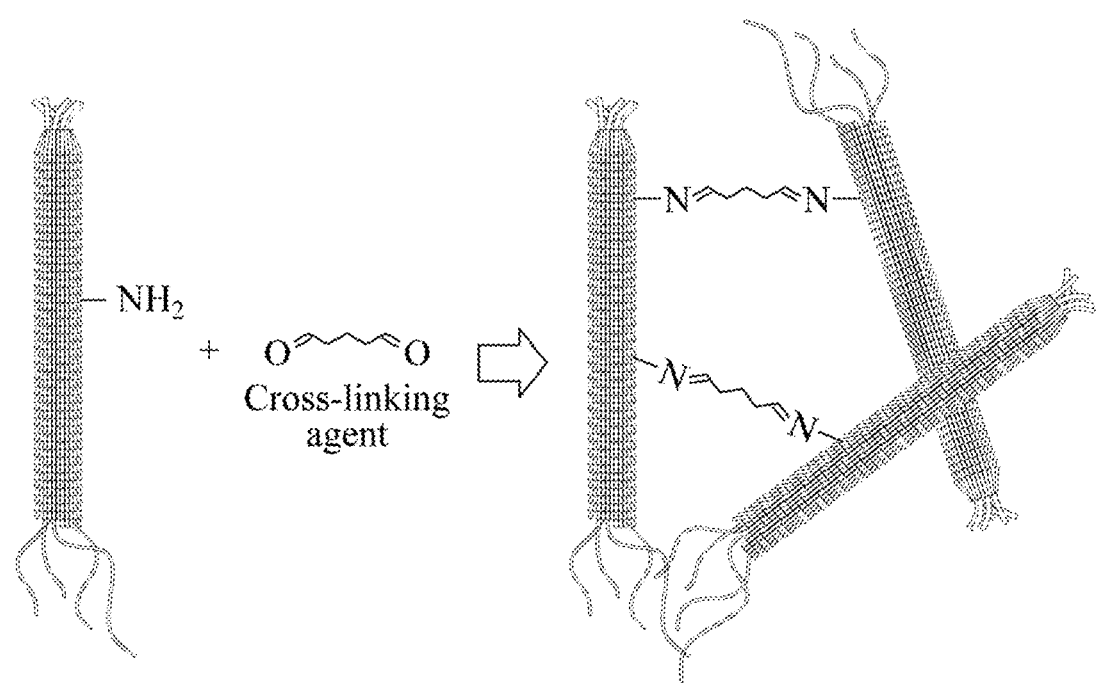
FIG. 1A illustrates a mechanism for forming hydrogel of an M13 virus according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "on" or "disposed on" another component, a third component may be present therebetween, although the first component may be directly on the other component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

The example embodiments relate to an electrode for gas generation that includes a gas generating electrode layer and a three-dimensional (3D) super-aerophobic layer.

The gas generating electrode layer is a region that induces a gas generation reaction, or a region in which a gas generation reaction occurs. Thus, the gas generating electrode layer may include a catalyst for the gas generation reaction. The gas generation reaction used herein may also be referred to as a gas evolution reaction.

According to an example embodiment, the gas generating electrode layer includes a transparent electrode layer and/or an opaque metallic electrode layer, and a catalytic material layer formed on the electrode layer.

In this example embodiment, any transparent electrodes that are applicable in the relevant technical field may be used as the transparent electrode layer without restriction. For example, a carbon and/or metal based transparent electrode, a carbon and/or metal based porous transparent electrode, and the like may be used. For example, a transparent electrode including a conductive substance such as, for example, ITO, IZO, ClO, ZnO, $SnO_2$, ATO, AZO, FTO, GZO, IGZO, CdO, indium (In)-doped $SnO_2$, RuO, aluminium (Al)-doped ZnO, $SiO_2$, $TiO_2$, MgO, carbon, carbon nanotube, wire, and graphene, or various types of porous transparent electrode such as, for example, metal wire/coil, fiber paper, fiber, cloth, foam, and wire/coil that include the conductive substance, may be used.

The catalytic material layer includes a catalyst including at least one selected from a group consisting of a metal, an oxide, a hydroxide, an oxyhydroxide, a nitride, an oxynitride, a carbide, a sulfide, a phosphide, a phosphate, and an alloy that include at least one selected from a group consisting of Pt, Ti, Sn, Zn, Mn, Mg, Ni, W, Co, Fe, Ba, In, Zr, Cu, Al, Bi, Pb, Ag, Cd, Ga, Y, Mo, Rh, Pd, Sb, Cs, La, V, Si, Al, Sr, B, and C. For example, Pt, Ti, copper phosphide ($Cu_3P$), WC, $MoS_2$, $BaTiO_3$, $BaSnO_3$, $Bi_2O_3$, $V_2O_5$, $VO_2$, $Fe_2O_3$ (or $\alpha$-$Fe_2O_3$), $Fe_3O_4$, $BiVO_4$, $Bi_2WO_4$, $TiO_2$, $SrTiO_3$, ZnO, CuO, $Cu_2O$, NiO, $SnO_2$, CoO, $In_2O_3$, $WO_3$, MgO, CaO, $La_2O_3$, $Nd_2O_3$, $Nb_2O_5$, $Y_2O_3$, $CeO_2$, PbO, $ZrO_2$, $Co_3O_4$, $Al_2O_3$, SiO, $SiO_2$, $MoS_2$, InPb, $RuO_2$, $CeO_2$, Sn-doped $\alpha$-$Fe_2O_3$, Ti-doped $\alpha$-$Fe_2O_3$, S-doped $TiO_2$, C-doped $TiO_2$, Mo-$BiVO_4$, W-doped $BiVO_4$, Pt/$In_2O_3$(ZnO)$_3$, Pt/$SrTiO_3$:Cr,Sb, Pt/$SrTiO_3$:Cr,Sb, Pt/$SrTiO_3$:Cr,Ta, Pt/$SrTiO_3$:Rh, Pt/$SnNb_2O_6$, Pt/$NaInS_2$, Pt/$AgInZn_7S_9$, Ru/$Cu_{0.09}In_{0.09}Zn_{1.82}S_2$, Ru/$Cu_{0.25}Ag_{0.25}In_{0.5}ZnS_2$, ZnS:Cu, ZnS:Ni, ZnS:Pb,Cl, Pt/CdS, $WO_3$, $Bi_2MoO_6$, $Bi_2WO_6$, $AgNbO_3$, $Ag_3VO_4$, $TiO_2$:Cr,Sb, $TiO_2$:Ni,Nb, $In_2O_3$(ZnO)$_3$, and the like may be used. However, examples are not limited to what have been enumerated in the foregoing.

The catalytic material layer includes a (photo)catalyst used for gas generation by an electrochemical or photoelectrochemical gas evolution reaction, oxidation, and reduction. For example, the catalyst may include an oxygen evolution reaction (OER) photocatalyst, an HER photocatalyst, and a nitrogen generation catalyst by a hydrazine reaction.

The catalyst may have at least one form selected from a group consisting of a sphere, a plate, a flake, a rod, a tube, a wire, and a needle.

The catalytic material layer may be nanometers (nm) to hundreds of micrometers (μm) thick. For example, the catalytic material layer may have a thickness of 1 nm or greater, 1 nm to less than 1000 μm, 10 nm to 900 μm, 20 nm to 500 μm, 20 nm to 10 μm, or 20 nm to 500 nm. When the thickness is included in such ranges described above, an effective electron movement path may be provided, thereby facilitating a gas evolution reaction, for example, a photoelectrochemical gas evolution reaction.

The catalytic material layer may include a single layer or a plurality of layers. The plurality of layers may include a same catalytic material or different catalytic materials, and/or have a same thickness or different thicknesses. According to another example embodiment, the gas generating electrode layer may include a semiconductor substrate. The semiconductor substrate may be, for example, a substrate including a semiconductor material layer, a silicon (Si) wafer, a p-type semiconductor substrate, or an n-type semiconductor substrate.

In this example embodiment, a semiconductor material includes at least one selected from a group consisting of a metal, an oxide, a nitride, an oxynitride, a carbide, a sulfide, a phosphide, and an alloy that include at least one selected from a group consisting of Pt, Ti, Sn, Zn, Mn, Mg, Ni, W, Co, Fe, Ba, In, Zr, Cu, Al, Bi, Pb, Ag, Cd, Ga, Y, Mo, Rh, Pd, Sb, Cs, La, V, Si, Al, Sr, B, and C. Alternatively, the semiconductor material may be a p-type or n-type semiconductor material. For example, the semiconductor material may include, for example, copper phosphide ($Cu_3P$), WC, $MoS_2$, $BaTiO_3$, $BaSnO_3$, $Bi_2O_3$, $V_2O_5$, $VO_2$, $Fe_2O_3$ (or $\alpha$-$Fe_2O_3$), $Fe_3O_4$, $BiVO_4$, $Bi_2WO_4$, $TiO_2$, $SrTiO_3$, ZnO, CuO, CU$_2$O, NiO, SnO$_2$, CoO, In$_2$O$_3$, WO$_3$, MgO, CaO, La$_2$O$_3$, Nd$_2$O$_3$, Nb$_2$O$_5$, Y$_2$O$_3$, CeO$_2$, PbO, ZrO$_2$, Co$_3$O$_4$, Al$_2$O$_3$, SiO, SiO$_2$, MoS$_2$, InPb, RuO$_2$, CeO$_2$, Sn-doped α-Fe$_2$O$_3$, Ti-doped α-Fe$_2$O$_3$, S-doped TiO$_2$, C-doped TiO$_2$, Mo—BiVO$_4$, W-doped BiVO$_4$, Pt/In$_2$O$_3$(ZnO)$_3$, Pt/SrTiO$_3$: Cr,Sb, Pt/SrTiO$_3$:Cr,Sb, Pt/SrTiO$_3$:Cr,Ta, Pt/SrTiO$_3$:Rh, Pt/SnNb$_2$O$_6$, Pt/NaInS$_2$, Pt/AgInZn$_7$S$_9$, Ru/Cu$_{0.09}$In$_{0.09}$Zn$_{1.82}$S$_2$, Ru/Cu$_{0.25}$Ag$_{0.25}$In$_{0.5}$ZnS$_2$, ZnS: Cu, ZnS:Ni, ZnS:Pb,Cl, Pt/CdS, WO$_3$, Bi$_2$MoO$_6$, Bi$_2$WO$_6$, AgNbO$_3$, Ag$_3$VO$_4$, TiO$_2$:Cr,Sb, TiO$_2$:Ni, Nb, a group III nitride such as In$_2$O$_3$(ZnO)$_3$, GaN, AlN, InN, InGaN, AlInN, AlGaN, and AlInGaN, and CdS, GaP, InP, GaAs, InPb, and the like. The semiconductor material may be more desirably a semiconductor material that may receive light and generate electrons and positive holes and include, for example, BiVO$_4$, α-Fe$_2$O$_3$, Fe$_2$O$_3$, WO$_3$, TiO$_2$, SrTiO$_3$, ZnO, CuO, Cu$_2$O, SnO$_2$, Sn-doped α-Fe$_2$O$_3$, Ti-doped α-Fe$_2$O$_3$, S-doped TiO$_2$, C-doped TiO$_2$, Mo-BiVO$_4$, and W-doped BiVO$_4$.

The semiconductor material layer may be nm to hundreds of μm thick. For example, the semiconductor material layer may have a thickness of 1 nm or greater, 1 nm to less than 1000 μm, 10 nm to 900 μm, 20 nm to 500 μm, 20 nm to 10 μm, or 20 nm to 500 nm. When the thickness is included in such ranges described above, an effective electron movement path may be provided, thereby facilitating a gas evolution reaction, for example, a photoelectrochemical gas evolution reaction.

The substrate may be a transparent substrate, for example, glass, sapphire, and transparent polymer substrates.

The p-type or n-type semiconductor substrate may be a group III nitride-based wafer including, for example, GaN, AlN, InN, InGaN, AlInN, AlGaN, AlInGaN, and the like.

According to an example embodiment, a surface of at least one portion of the gas generating electrode layer is treated with alkoxy silane. The surface treatment may be performed through thermal annealing after immersing and/or coating the gas generating electrode layer using the alkoxy silane.

Such organic alkoxy silane may be, for example, methyltrimethoxysilane (MTMS), n-propyltrimethoxysilane, isobutyltrimethoxysilane, octlytrimethoxysilane, hexadecyltrimethoxysilane, perfluoropropyltrimethoxysilane tridecafluoro-1,1,2,2-tetrahydrooctyl trimethoxysilane, vinyltrimethoxysilane, vinyl-methyldimethoxysilane, vinyltris(2-methoxyethoxy)silane, phenyltrimethoxysilane, 3-aminopropyltrimethoxysilane, 3-aminopropylmethyldimethoxysilane, N-(n-butyl)-3-aminopropyltrimethoxysilane, N-(2-aminoethyl)-3-aminopropyltrimethoxysilane, N-(2-aminoethyl)-3-aminopropylmethyldimethoxysilane, triaminoethylpropyltrimethoxysilane, 3-mercaptopropyltrimethoxysilane, 3-glycidyloxypropyltrimethoxysilane, 3-methacryloxypropyltrimethoxysilane, 3-methacryloxy-2-methylpropyltrimethoxysilane, methyltriethoxysilane, n-propyltriethoxysilane, octyltriethoxysilane, hexadecyltriethoxysilane, vinyltriethoxysilane, vinylmethyldiethoxysilane, phenyltriethoxysilane, 3-aminopropyltriethoxysilane, 3-aminopropylmethyldiethoxysilane, N-(n-butyl)-3-aminopropyltriethoxysilane, N-(2-aminoethyl)-3-aminopropyltriethoxysilane, N-(2-aminoethyl)-3-aminopropylmethyldiethoxysilane, triaminoethylpropyltriethoxysilane, 3-mercaptopropyltriethoxysilane, 3-glycidyloxypropyltriethoxysilane, 3-methacryloxypropyltriethoxysilane, 3-methacryloxy-2-methylpropyltriethoxysilane, and the like. However, the alkoxy silane is not limited to the examples described in the foregoing.

The 3D super-aerophobic layer is formed on at least one portion of the gas generating electrode layer, and includes porous hydrogel. The porous hydrogel may have a super-aerophobic function, and facilitate separation or detachment of gas generated in in the gas generating electrode layer to expand a gas reaction portion of the gas generating electrode layer and improve a level of stability and a gas generating effect of the electrode.

According to an example embodiment, the 3D super-aerophobic layer includes polymer-based hydrogel, linear virus-based hydrogel, or both the polymer-based hydrogel and the linear virus-based hydrogel. That is, the 3D super-aerophobic layer may be formed in a 3D network structure through cross linking by adding a cross-linking agent to a polymer, a linear virus, or a mixture of the polymer and the linear virus. Such structure may be stably deposited on or applied onto the gas generating electrode layer as the 3D porous hydrogel without damaging the gas generating electrode layer.

Here, any substances that provide super-aerophobicity and form porous hydrogel may be used for the polymer-based hydrogel without restriction. For example, the polymer-based hydrogel may include a hydrophilic polymer, a hydrophobic polymer, or both the hydrophilic polymer and the hydrophobic polymer. In detail, the polymer-based hydrogel may include, for example, gelatin, keto acid, elastin, hyaluronic acid, hydroxyapatite, alginate, collagen, cellulose, polyethylene glycol (PEG), polyethylene oxide (PEO), polycaprolactone (PCL), polylactic acid (PLA), polyglycolic acid (PGA), poly[(lactic-co-(glycolic acid)] (PLGA), poly[(3-hydroxybutyrate)-co-(3-hydroxyvalerate)] (PHBV), polydioxanone (PDO), poly[(L-lactide)-co-(caprolactone)], poly(ester urethane) (PEUU), poly[(L-lactide)-co-(D-lactide)], poly[ethylene-co-(vinyl alcohol)] (PVOH), polyacrylic acid (PAA), polyvinyl alcohol (PVA), polyvinylpyrrolidone (PVP), polystyrene (PS), and polyaniline (PAN), an acrylic polymer such as an acrylic acid and methacrylic acid copolymer, a methacrylic acid copolymer, a methyl methacrylate copolymer, an ethoxyethyl methacrylate copolymer, a cyanoethyl methacrylate copolymer, an aminoalkyl methacrylate copolymer, a poly(acrylic acid) copolymer, a polyacrylamide copolymer, a glycidyl methacrylate copolymer, and the like, and a polymer such as poly-L-lactic acid (PLLA), polycaprolactone (PCL), polyanhydride, polyorthoester, polyurethane, poly-N-isopropyl acrylamide, poly (ethylene oxide)-poly(propylene oxide)-poly(ethylene oxide) copolymer, and the like. However, the polymer-based hydrogel is not limited to the examples described in the foregoing.

In addition, the polymer-based hydrogel may include hydrogel formed by cross linking of a polymer and a monomer, for example, polyvinyl alcohol and vinyl-based monomer hydrogel. In this example, a vinyl-based monomer may include, for example, acrylic acid, methacrylic acid, methacrylamide, hydroxyethyl methacrylate, glycidyl acrylate, cinnamic acid, vinylpyrrolidone, methyl metacrylate, and the like. However, the vinyl-based monomer is not limited to the examples described in the foregoing. The linear virus may be, for example, an M13 virus. Through the cross-linking of such by the cross-linking agent, the porous hydrogel of the 3D network structure may be formed, and this may be integrated onto the gas generating electrode layer, thereby enabling super-aerophobicity.

The cross-linking agent may include at least one selected from a group consisting of glutaraldehyde, epichlorohydrin (EPC), piperazine diacrylamide, ethyl diethylaminopropyl carbodiimide (EDC), genepin, transglutaminase (TG), formaldehyde, N,N'-methylene-bis-acrylamide, N,N,N',N'-tetramethyl ethylene diamine, ethylene glycol dimethacrylate, glyoxal, acrylic acid, maleic acid (MA), polymaleic acid (PMA), succinic acid (SA), citric acid (CA), phosphoric acid (PA), tetraetoxysilane, boric acid (BA), and ethers such as ethylene glycol diglycidyl ether (EGDGE), 1,4-butandiol diglycidyl ether (BDDE), 1,6-hexanediol diglycidyl ether, propylene glycol diglycidyl ether, polypropylene glycol diglycidyl ether, diglycerol polyglycidyl ether, and 1-ethyl-3-(3-dimethylaminopropyl)carbodiimide (EDC), and the like. However, the cross-linking agent is not limited to what have been enumerated in the foregoing.

To improve efficiency and performance in gas separation by a super-aerophobicity function of hydrogel and in gas generation of the gas generating electrode layer, the 3D super-aerophobic layer may have a thickness of 5 µm or greater, 5 µm to 500 µm, 5 µm to 300 µm, or 5 µm to 100 µm, and have an air pore with a diameter of 500 nm or greater, 1 µm or greater, 1 µm to 100 µm, 1 µm to 50 µm, or 1 µm to 20 µm. In addition, the 3D super-aerophobic layer may have porosity, or a ratio of a pore volume to a total volume, the porosity being 1% to less than 100%, 1% to 90%, 20% to 80%, 40% to 90%, or 50% to 80%.

The electrode according to an example embodiment may be applied to various gas generation or evolution reactions. For example, the electrode may be used as a (photo) electrode to generate gas such as, for example, hydrogen, oxygen, chlorine, nitrogen, and the like by an electrochemical or photoactivity-based photoelectrochemical reaction, a hydrazine reaction-based (photo)decomposition of water, organic materials, and nitrogen compound, and an oxidation and a reduction, and the like. However, the gas generation or evolution reactions are not limited to the example reactions described in the foregoing. For example, the electrode may be used as a (photo)electrode for a hydrogen evolution reaction (HER), an oxygen evolution reaction (OER), and generation of $N_2$ by $N_2H_4$ (hydrazine) oxidation in a hydrazine fuel cell.

According to another example embodiment, there is provided a device including an electrode for gas generation. Any device that may enable a gas generation reaction using the electrode may be applied as the device without restrictions. The device may facilitate the gas generation reaction using an electrochemical or photoelectrochemical decomposition reaction by the electrode. The device may be, for example, a photoelectrochemical water splitting device, a hydrogen generating device configured to generate hydrogen from an organic compound (e.g., alcohol, aldehyde, organic acid, ester) by a hydrazine oxidation and a dehydrogenation photooxidation reaction, a fuel converter, a nitrogen generating device, a fuel cell (e.g., hydrazine fuel cell, hydrogen fuel cell), a chlorine gas generating device, and a device or system for reduction and/or recycling of carbon dioxide ($CO_2$).

The device may be a photoelectrochemical cell including the electrode described herein as a photoelectrode. The device may further include a counter electrode and a reference electrode to operate the photoelectrochemical cell, which are not described in detail herein.

According to still another example embodiment, there is provided a method of preparing an electrode for gas generation. The method includes preparing a gas generating electrode layer, and forming a 3D super-aerophobic layer.

The preparing of the gas generating electrode layer includes preparing a semiconductor substrate, and applying an acid treatment to a surface of the semiconductor substrate. For a detailed description of the semiconductor substrate, reference may be made to what has been described above in relation to the electrode.

The acid treatment may be applied to remove impurities through the acid treatment from the surface of the semiconductor substrate. In the acid treatment, an acid and a concentration of the acid may be adjusted based on the semiconductor substrate. The acid may be, for example, hydrofluoric acid, hydrochloric acid, acetic acid, nitric acid, and the like.

Alternatively, the preparing of the gas generating electrode layer includes preparing a transparent electrode, and forming a catalytic material layer on the transparent electrode.

For a detailed description of the preparing of the transparent electrode, reference may be made to what has been described above in relation to the electrode.

The forming of the catalytic material layer may be performed by forming the catalytic material layer on the transparent electrode or allowing the catalytic material layer to grow on the transparent electrode, through e-beam evaporation, thermal evaporation, plasma-enhanced chemical vapor deposition (PECVD), low pressure vapor deposition (LPCVD), physical vapor deposition (PVD), chemical vapor deposition (CVD), atomic layer deposition (ALD), vacuum deposition, sputtering, spin coating, spin casting, dip coating, printing, spray coating, roll coating, brush coating, doctor blades, and the like.

Before the forming of the catalytic material layer is performed, a surface of the transparent electrode may be treated with plasma, and such plasma treatment may use at least one selected from a group consisting of oxygen, air, nitrogen, and inert gas such as argon.

The method further includes treating a surface of the gas generating electrode layer with alkoxy silane. Such surface treatment using alkoxy silane may be used to provide an electric charge to a substrate, for example, the semiconductor substrate and the transparent electrode, and allow hydrogel, or an M13 virus, to be electrostatically attached, thereby improving stability of the hydrogel.

The treating of the surface with alkoxy silane includes applying a plasma treatment to the surface of the gas generating electrode layer, immersing the plasma treated gas generating electrode layer in an alkoxy silane solution, and thermally annealing the gas generating electrode layer obtained after the immersing.

The applying of the plasma treatment is performed by applying the plasma treatment to the surface of the gas generating electrode layer for 1 second or greater, 1 second to 30 minutes, or 30 seconds to 10 minutes. The plasma treatment may use at least one selected from a group consisting of oxygen, air, nitrogen, and inert gas such as argon.

The immersing of the plasma treated gas generating electrode layer is performed by immersing the plasma treated gas generating electrode layer in the alkoxy silane solution by a weight percent (wt %) of 1 wt % or greater, 1 wt % to 30 wt %, or 1 wt % to 20 wt % for 1 minute or greater, 1 minute to 2 hours, or 5 minutes to 30 minutes. The immersing of the plasma treated gas generating electrode layer is performed at a temperature of a room temperature to 50° C.

After the immersing of the plasma treated gas generating electrode layer in the alkoxy silane solution, the thermal annealing is performed at a temperature of 100° C. to 300° C., or a temperature of 150° C. to 250° C., for 10 minutes or greater, 10 minutes to 2 hours, or 30 minutes to 2 hours.

In addition, the thermal annealing may be performed in an atmosphere or under a condition including air, oxygen, inert gas, and the like.

The forming of the 3D super-aerophobic layer is performed by forming a 3D super-aerophobic layer including porous hydrogel on at least one portion of the gas generating electrode layer.

For example, the forming of the 3D super-aerophobic layer includes forming a coating composition by mixing a polymer, a linear virus, or both the polymer and the linear virus, and a cross-linking agent, and coating the gas generating electrode layer with the coating composition.

When forming of the coating composition, the polymer, the linear virus, or both the polymer and the linear virus, and the cross-linking agent may be mixed at a weight ratio of 1:0.0001 to 1:1, 1:0.0001 to 1:0.5, and 1:0.001 to 1:0.2, in order to form hydrogel that is stably attached and capable of realizing super-aerophobicity. In a case of using the linear virus, a ratio between a volume of the linear virus and a volume of the cross-linking agent may be 1:0.1 to 1:5, or 1:0.5 to 1:1 ($\mu L/\mu L$). For example, per 10 microliter ($\mu L$) of a virus with a certain concentration, 1 $\mu L$ of a cross-linking agent may be added at a weight ratio of 0.1 wt % to 2 wt %, or 0.5 wt % to 1 wt %.

For example, the linear virus may be added at a concentration of $1.0 \times 10^{13}$ pfu/mL or greater, $1.0 \times 10^{13}$ pfu/mL to 50 pfu/mL, or $1.0 \times 10^{13}$ pfu/mL to 20 pfu/mL.

The coating composition further includes a solvent. As the solvent, any types of solvent that are applicable to disperse, dilute, and/or dissolve the polymer and the linear virus may be used without limitation. For example, the solvent may be a hydrophilic solvent including, for example, water, ethanol, alcohol such as isopropyl alcohol and 3-methoxy-3-methyl-1-butanol, glycol such as propylene glycol and ethylene glycol, and glycol ether such as ethylene glycol monoethyl ether, and an organic solvent including, for example, dimethyl sulfoxide, tetrahydrofuran, and cyclohexane. However, the solvent is not limited to what have been enumerated in the foregoing.

The coating of the gas generating electrode layer with the coating composition is performed to form a thin porous surface film or sheet by the coating composition by dispersing the coating composition on the gas generating electrode layer. For the coating, spin coating, dip coating, printing, spray coating, roll coating, brush coating, doctor blades, and the like may be used. However, the coating is not limited to what have been enumerated in the foregoing as examples of the coating.

After the coating, drying may be further performed. The drying may be performed through at least one of vacuum drying, low temperature drying, or freeze-drying. For the drying, the freeze-drying may be performed desirably for one day or more, one to five days, or one to three days.

Alternatively, the forming of the 3D super-aerophobic layer may include forming a first mixture including a solvent, and a polymer, a linear virus, or both the polymer and the linear virus, forming a second mixture by mixing a cross-linking agent after disposing the first mixture on the gas generating electrode layer, and dispersing the second mixture on the gas generating electrode layer.

When forming the second mixture, a weight ratio between the polymer, the linear virus, or both the polymer and the linear virus, and the cross-linking agent may be 1:0.0001 to 1:1, 1:0.0001 to 1:0.5, or 1:0.001 to 1:0.2. In a case of using the linear virus, a ratio between a volume of the linear virus and a volume of the cross-linking agent may be 1:0.1 to 1:5, or 1:0.5 to 1:1 ($\mu L/\mu L$.) For example, per 10 $\mu L$ of a virus with a certain concentration, 1 $\mu L$ of a cross-linking agent may be added at a weight ratio of 0.1 wt % to 2 wt %, or 0.5 wt % to 1 wt %.

For example, the linear virus may be added at a concentration of $1.0 \times 10^{13}$ pfu/mL or greater, $1.0 \times 10^{13}$ pfu/mL to 50 pfu/mL, or $1.0 \times 10^{13}$ pfu/mL to 20 pfu/mL.

Here, a solvent may be further included. As the solvent, any types of solvent that are applicable to disperse, dilute, and/or dissolve the polymer and the linear virus may be used without limitation. For example, the solvent may be a hydrophilic solvent including, for example, water, ethanol, alcohol such as isopropyl alcohol and 3-methoxy-3-methyl-1-butanol, glycol such as propylene glycol and ethylene glycol, and glycol ether such as ethylene glycol monoethyl ether, and an organic solvent including, for example, dimethyl sulfoxide, tetrahydrofuran, and cyclohexane. However, the solvent is not limited to what have been enumerated in the foregoing as examples of the solvent.

The dispersing of the second mixture may be performed to form a thin porous surface film or sheet on at least one portion of the gas generating electrode layer by dispersing the second mixture thereon by applying a pressure, a rotational force, or both the pressure and the rotation force. For the dispersing of the second mixture, spin coating, roll pressing, doctor blades, and the like may be used.

After the dispersing of the second mixture, drying may be further performed. The drying may be performed through at least one of vacuum drying, low temperature drying, or freeze-drying. For the drying, the freeze-drying may be performed desirably for one day or more, one to five days, or one to three days.

Hereinafter, an electrode for gas generation according to an example embodiment will be described in detail with reference to examples and drawings. However, the present disclosure is not limited to what is described with reference to the examples and the drawings.

EXAMPLE 1

Preparation of Electrode for Photoelectrochemical HER

FTO/Ti(30 nm)/Pt(100 nm)/3D super-aerophobic hydrogel layer (1) Forming an FTO/Ti(30 nm)/Pt(100 nm) electrode After a titanium (Ti) (30 nanometers [nm]) deposition layer was formed on a transparent fluorine-doped tin oxide (FTO) electrode through e-beam evaporation, a Pt (100 nm) deposition layer was formed on the FTO/Ti (30 nm) electrode through e-beam evaporation.

(2) Forming a 3D super-aerophobic hydrogel layer on the Pt electrode layer

A Pt surface of the prepared FTO/Ti(30 nm)/Pt(100 nm) electrode was treated with O2 plasma for 1 to 3 minutes, and then was immersed in a 10 wt % (3-aminopropyl)triethoxysilane (APTES) solution for 10 minutes. Subsequently, the electrode obtained after the immersing was annealed at a temperature of 180° C. for 1 hour.

A specific amount (100 $\mu L$) of an M13 virus was placed on the APTES-treated electrode ata concentration of 0.1×, 1×, and 3×, respectively. Here, 1× indicates $5.0 \times 10^{13}$ pfu/mL, 0.1× indicates 1/10 thinner or less concentrated than the 1× concentration, and 3× indicates 3 times the 1× concentration. Subsequently, 1 wt % glutaraldehyde which is a cross-linking agent was mixed and dispersed using doctor blades to form a thin coated layer. Subsequently, the coated electrode was freeze-dried for 3 to 4 days.

EXAMPLE 2

Preparation of Electrode for Photoelectrochemical HER

Si wafer/3D super-aerophobic hydrogel layer

Forming a 3D super-aerophobic hydrogel layer on an Si wafer electrode layer

The electrode was prepared by treating a surface of the Si wafer with hydrofluoric acid to remove SiOx. The wafer surface was treated with O2 plasma for 1 to 3 minutes. Subsequently, the plasma treated electrode was immersed in a 10 wt % (3-aminopropyl)triethoxysilane (APTES) solution for 10 minutes, and then was annealed at a temperature of 180° C. for 1 hour.

A specific amount (100 µL) of a M13 virus was placed on the APTES-treated electrode at a concentration of 0.1×, 1×, and 3×, respectively. Here, 1× indicates 5.0×1013 pfu/mL, 0.1× indicates 1/10 thinner or less concentrated than the 1× concentration, and 3× indicates 3 times the 1× concentration. Subsequently, 1 wt % glutaraldehyde which is a cross-linking agent was mixed and dispersed using doctor blades to form a thin coating layer. Subsequently, the coated obtained was freeze-dried for 3 to 4 days.

Figure 1B:
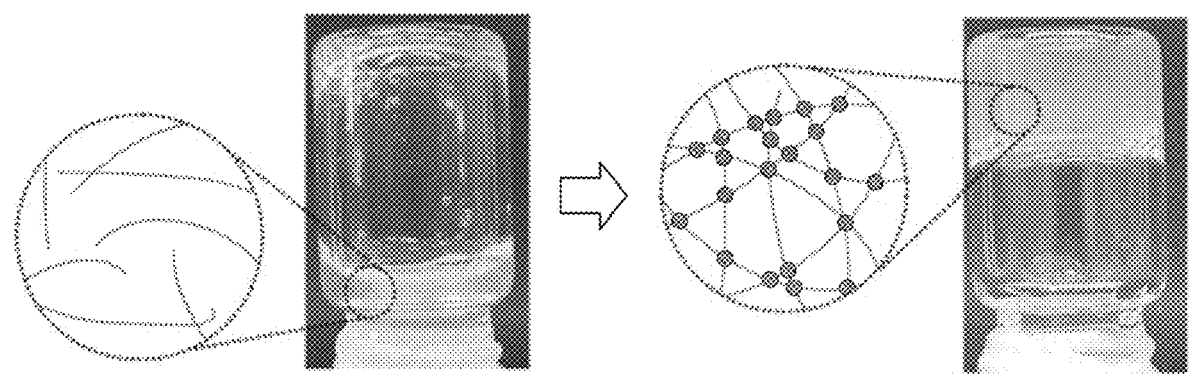
FIG. 1B is an image of an M13 virus solution (left) and an image of M13 virus-based hydrogel (right) according to an example embodiment.

Referring to FIGS. 1A and 1B, porous hydrogel may be formed by mixing NH2 functional groups of M13 virus using glutaraldehyde as a cross-linking agent. When the hydrogel is formed, a solution may become static first, and not flow even if a vial is turned upside down.

Figure 1C:
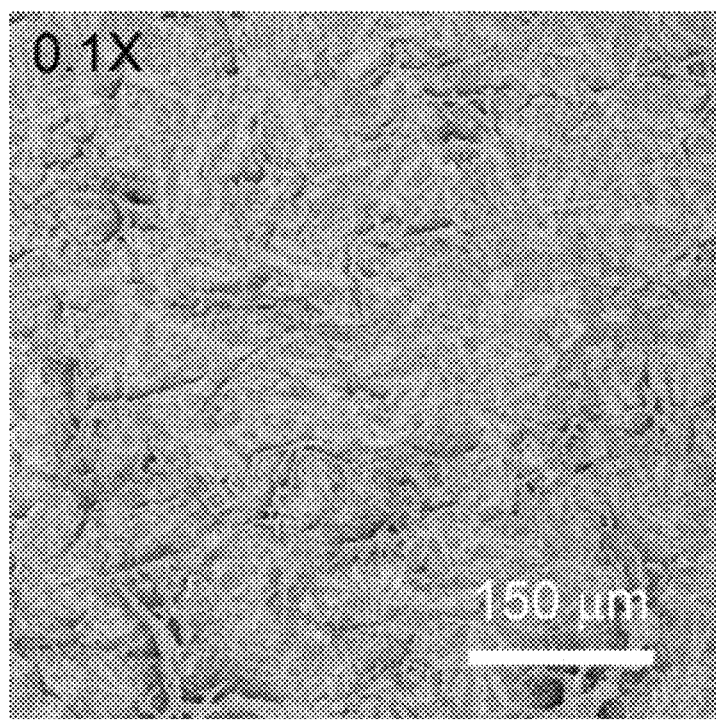
FIG. 1C is a scanning electron microscope (SEM) image of a hydrogel surface with an initial virus concentration (0.1×) of M13 virus-based hydrogel formed on a silicon (Si) wafer according to an example embodiment.
Figure 1D:
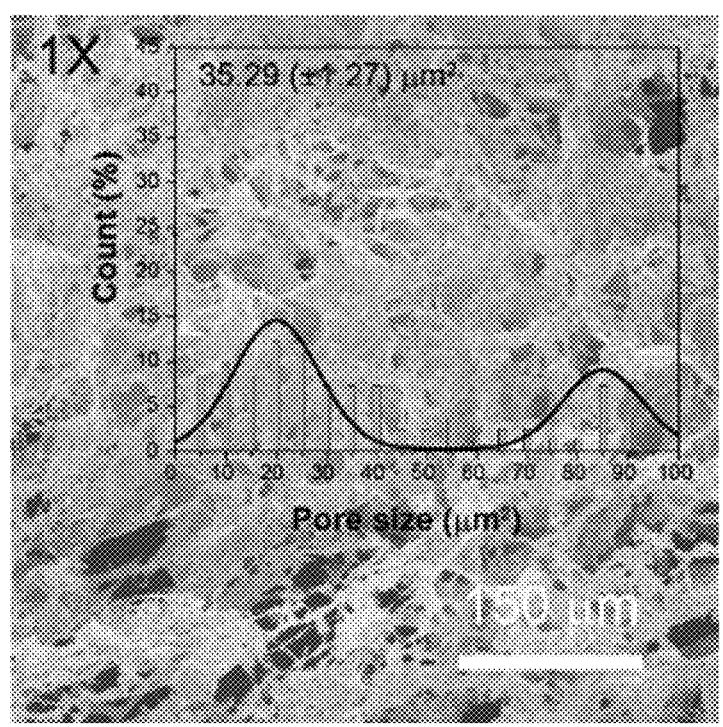
FIG. 1D illustrates a contact angle at an initial virus concentration (1×) of M13 virus-based hydrogel formed on a Si wafer according to an example embodiment.
Figure 1E:
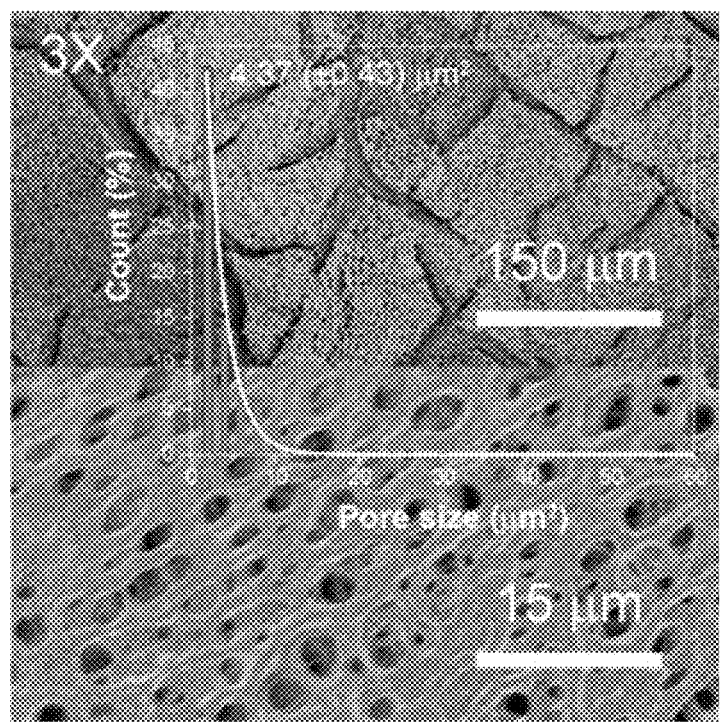
FIG. 1E is an image of a contact angle and a sliding angle at an initial virus concentration (3×) of M13 virus-based hydrogel formed on a Si wafer according to an example embodiment.

Referring to FIGS. 1C through 1E, an initial concentration of M13 virus is set to be 0.1×, 1×, and 3×, respectively, to verify porosity of hydrogel through scanning electron microscope (SEM) images. Here, the Si wafer electrode prepared as described in Example 2 was used for all samples used. A porous structure was not formed at the 0.1× concentration. However, a porous structure was observed at the 1× and 3× concentrations. It is verified through an inset graph that, when the concentration of M13 virus increases, sizes of the porous structures become consistent or equalized. In addition, in a SEM image of hydrogel with an initial concentration of 3× of M13 virus, an upper portion was cracked or divided, and a cross-sectional structure of the cracked portion is expected to have a considerably high level of porosity, enabling generated hydrogen to be more readily separated from the electrode.

Figure 1F:
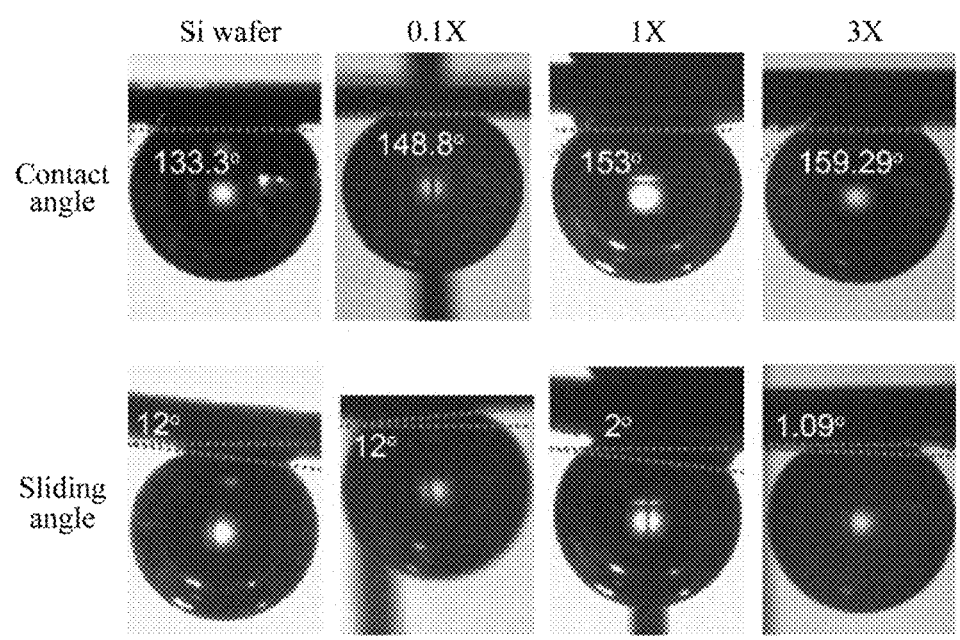
FIG. 1F is an image of a contact angle and of a sliding angle at an initial virus concentration (0.1×, 1×, 3×) of M13 virus-based hydrogel formed on a Si wafer according to an example embodiment.
Figure 1G:
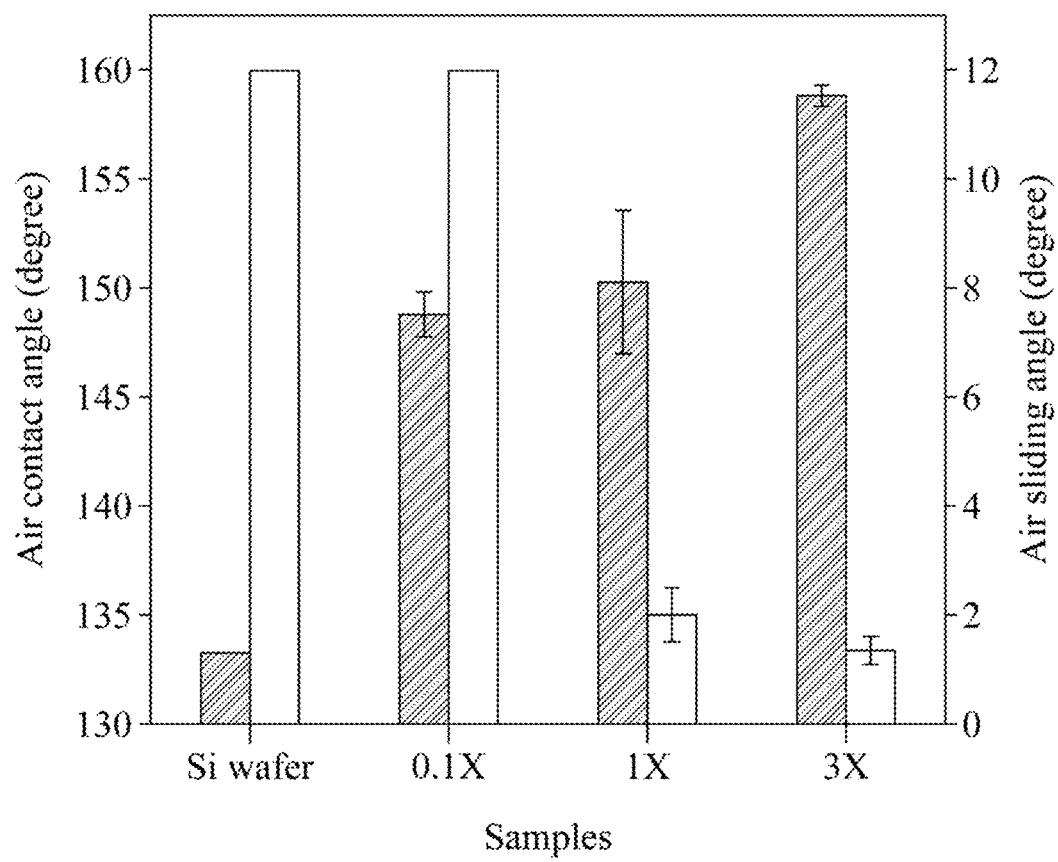
FIG. 1G is a graph of a sliding angle at an initial virus concentration (0.1×, 1×, 3×) of M13 virus-based hydrogel formed on a Si wafer according to an example embodiment.

Referring to FIGS. 1F and 1G, after the porosity is verified based on an initial concentration of an M13 virus, a contact angle is measured to verify aerophobicity. Here, the Si wafer electrode prepared as described in Example 2 was used for all samples used. A Si wafer had a smallest air bubble contact angle, and 3× hydrogel had a greatest air bubble contact angle. When a contact angle increases, an air bubble is expected to be more readily separated from the electrode, or the substrate. In addition, a sliding angle of the electrode is a measure to verify how fast and readily an air bubble is separated or detached from the electrode. When a sliding angle decreases, it is verified that an air or gas bubble tends to be more readily separated or detached from the electrode or the substrate. Thus, it is verified, through the SEM images and the images showing air contact/sliding angles, that porosity increases when a concentration of an M13 virus increases, and an air bubble tends to be more readily separated or detached from the electrode when the porosity increases. Such a tendency indicates a high level of aerophobicity.

Figure 2A:
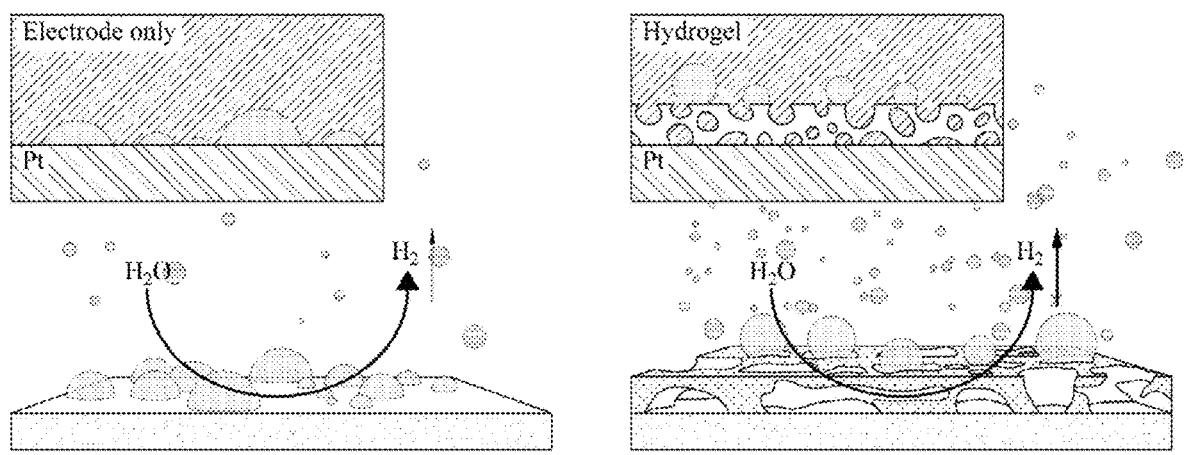
FIG. 2A illustrates an example of a hydrogen gas forming angle and an example of hydrogen gas generation in the absence of M13 virus-based hydrogel (left) and in the presence of M13 virus-based hydrogel (right) according to an example embodiment.

FIG. 2A illustrates a comparison of an electrode (Pt electrode) with hydrogel not formed, and an electrode (Pt electrode/hydrogel layer) with hydrogel formed thereon through doctor blading on the Pt electrode prepared as described in Example 1, in terms of an amount of hydrogen generated, an angle at which hydrogen gas is formed, and how hydrogen is generated.

Figure 2B:
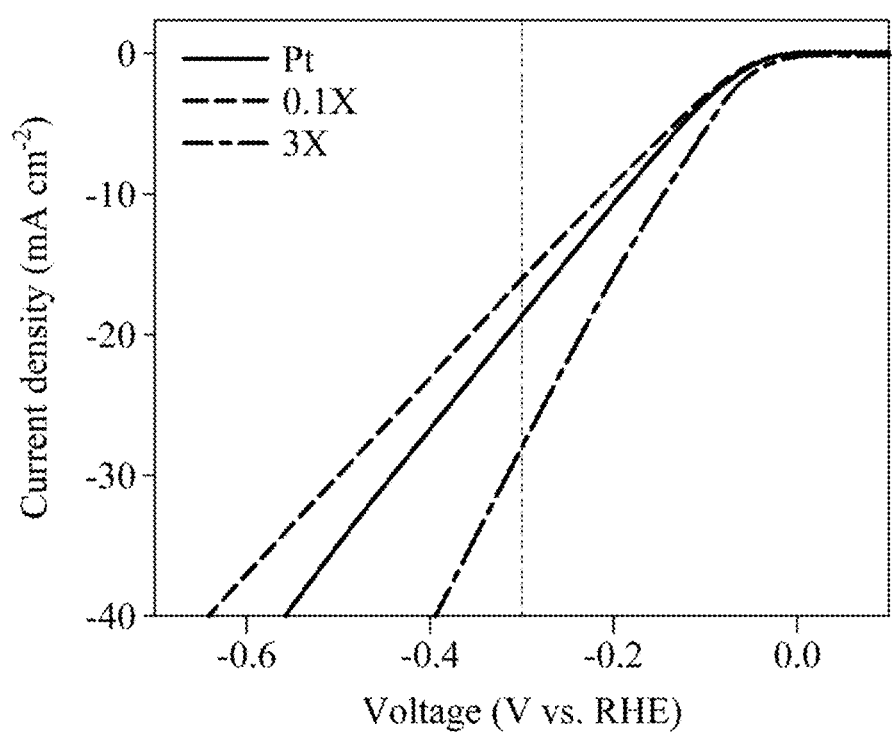
FIG. 2B is a linear sweep voltammogram (LSV) of a hydrogen evolution reaction (HER) according to an example embodiment.

In a case of using the electrode only as illustrated in a left portion of FIG. 2A, an air contact angle was small as in the Si wafer illustrated in FIG. 1F, and hydrogen gas generated in the electrode was not readily separated a surface of the electrode. In contrast, in a case of the Pt electrode with hydrogel formed, an air contact angle was large due to the use of a virus with an initial concentration of 3×, and thus porosity and super-aerophobicity were achieved by the hydrogel formed on the electrode. Thus, a current density of the 3× hydrogel is expected to be higher during scanning, which is verified through a current density graph as illustrated in FIG. 2B. That is, when hydrogen gases are attached to the electrode, an active site for a HER may be blocked and efficiency may thus be degraded. However, hydrogen gas generated from the 3× hydrogel electrode at a current density may not block a catalytic active site for a HER, but expose it, and thus a higher level of efficiency may be obtained.

Figure 2C:
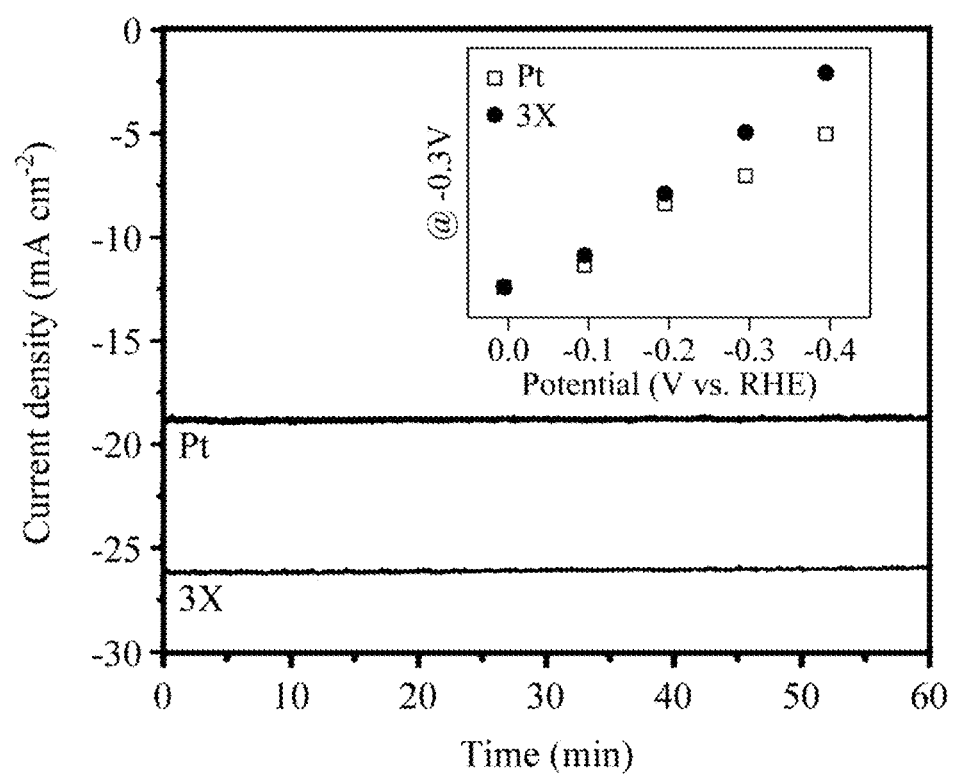
FIG. 2C is a graph of a current density at a constant voltage of −0.3 V for one hour, compared to that in a reversible hydrogen electrode (RHE) according to an example embodiment.

FIG. 2C is a graph of a current density at a constant voltage, for example, −0.3V, compared to that in a reversible hydrogen electrode (RHE). Referring to the graph, it is verified that there is a significant difference in current density when a voltage to be applied is higher.

Figure 2D:
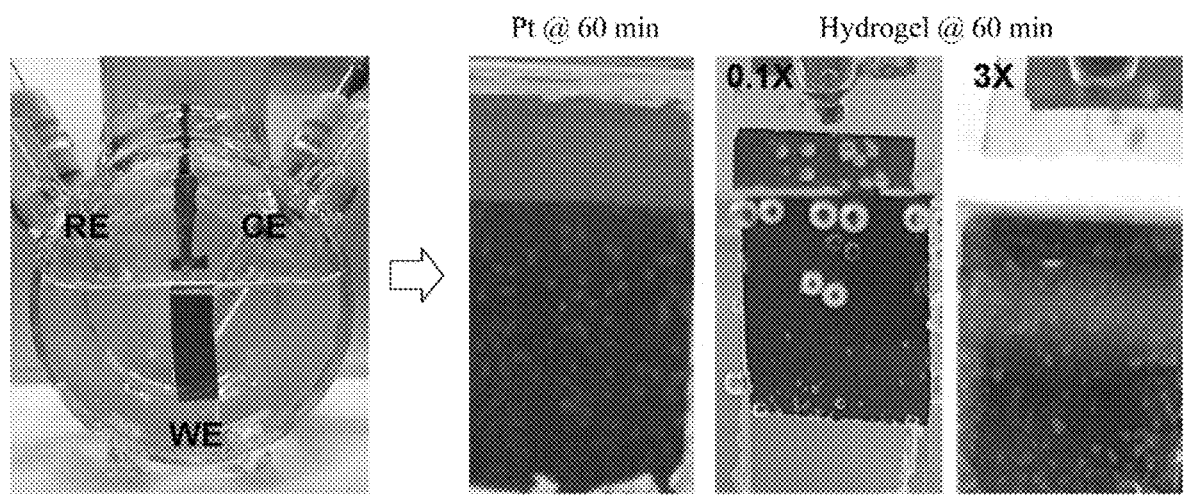
FIG. 2D is an image (left) of an electrochemical reaction cell in which a super-aerophobic electrode is provided, and a digital image (right) captured in real time to observe an amount of gas generated during an electrochemical HER according to an example embodiment.

Referring to FIG. 2D, it is verified that, at a virus concentration of 0.1× in 60 minute, a size of hydrogen gas attached to the electrode is large at a virus concentration of 0.1× and less hydrogen gas is generated, by observing the electrode (left image) to simultaneously verify in real time separation of hydrogen bubbles while applying a voltage and observing how much hydrogen gas is generated or separated at a certain voltage, for example, −0.3 V, compared to an RHE. It is also verified that a greater amount of hydrogen gas is generated at a virus concentration of 3× compared to Pt, and it is thus expected that a level of separation of hydrogen gas generated in the electrode is high at the same voltage.

Figure 3A:
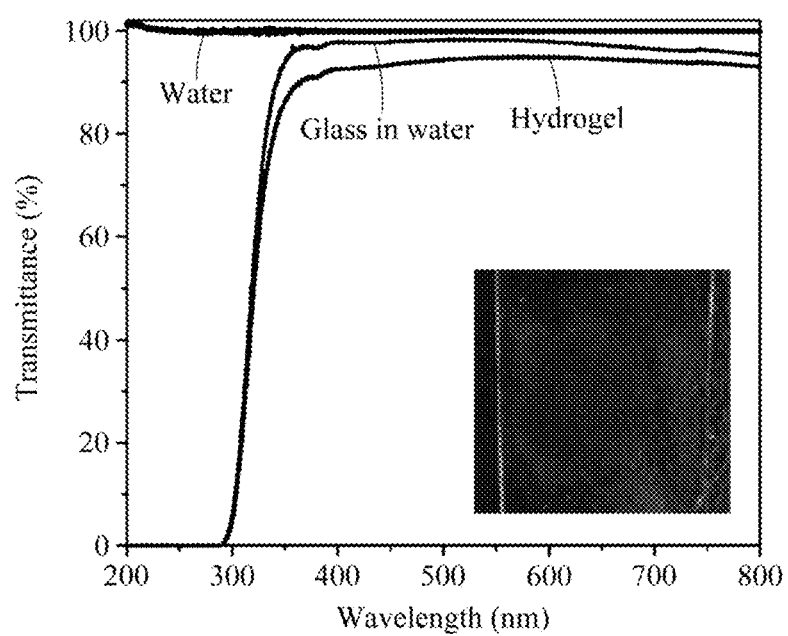
FIG. 3A illustrates an example of an ultraviolet-visible (UV-Vis) spectrum of water, hydrogel, and glass in water according to an example embodiment.

Referring to FIG. 3A, transmittance is observed by forming hydrogel in a slide glass and disposing it in a cuvette. Samples used include a water sample (cuvette+water), a hydrogel sample (slide glass including hydrogel+cuvette+water), and a glass in water (cuvette+water+slide glass without anything). In an ultraviolet-visible (UV-Vis) spectrum, approximately 90% of transmittance is maintained in hydrogel, and thus it may be fully used for photoelectrochemical water splitting, and the inset image illustrates transparency observed by dropping water into the slide glass including hydrogel.

Figure 3B:
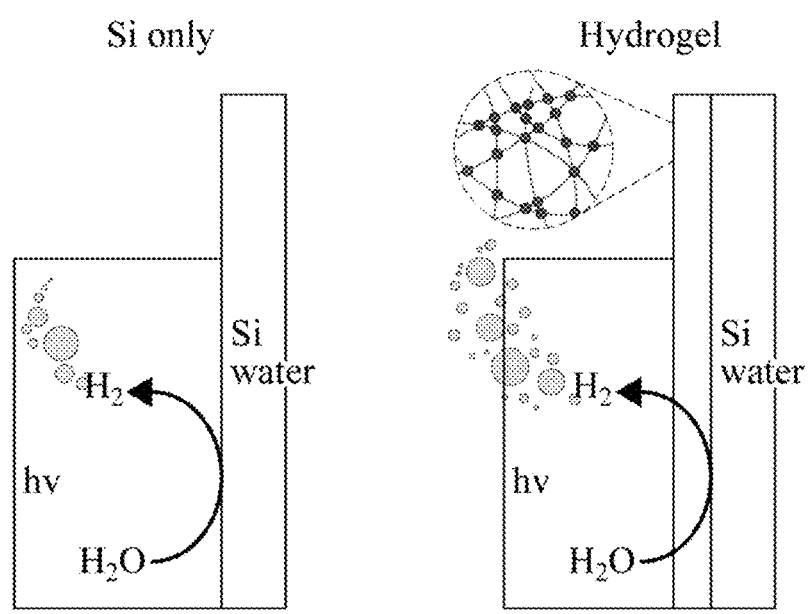
FIG. 3B illustrates an example of photoelectrochemical HER on an electrode according to an example embodiment.

FIG. 3B illustrates an example of how hydrogen is generated using a silicon electrode, and a silicon electrode and hydrogel, for photoelectrochemical water splitting. As illustrated, gas may be more readily separated by super-aerophobicity of hydrogel.

Figure 3C:
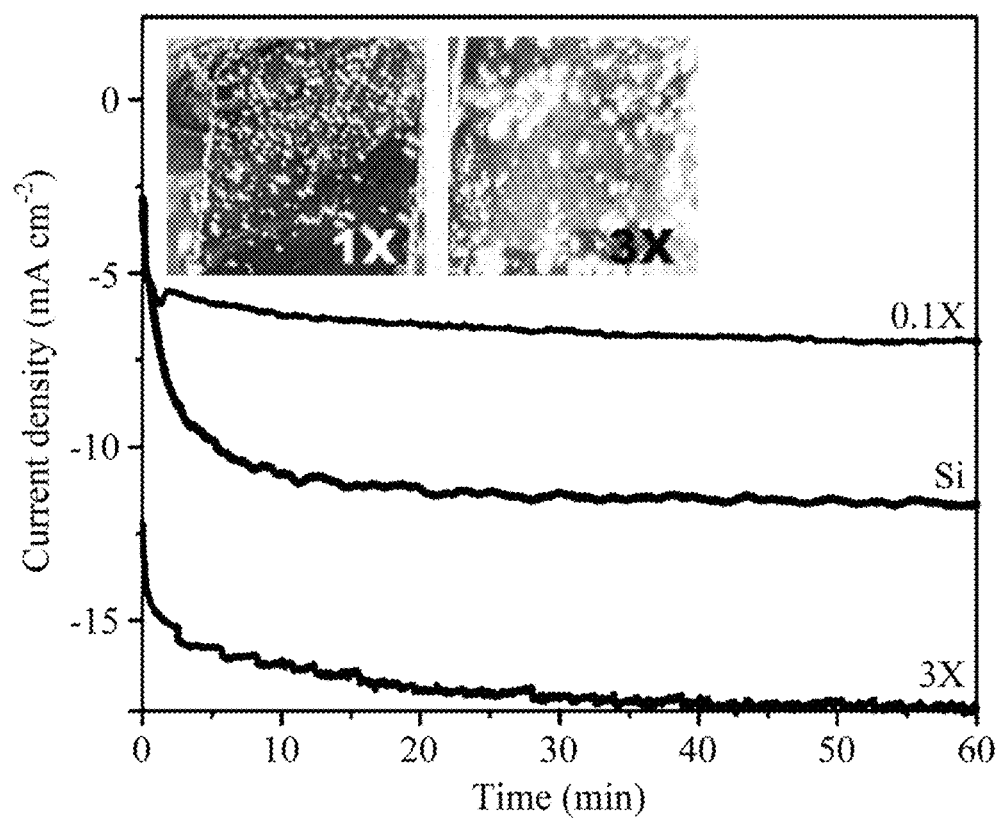
FIG. 3C is a graph of a current density under a condition of a constant voltage and a visible light illumination of an electrode according to an example embodiment.

Referring to FIG. 3C, it is verified that a current density is highest at a virus concentration of 3× when visible light is illuminated at a constant voltage. This is because hydrogen gas is more readily attachable or detachable at a virus concentration of 3× in a photoelectrochemical hydrogen evolution reaction as shown in the inset images and the illustrated graph.

According to an example embodiment, a super-aerophobic electrode may be prepared by attaching, as transparent porous hydrogel, a linear M13 virus which is one of harmless and environmentally-friendly nano-bio elements or materials, to a surface of a metal electrode, and may thus allow gas to be more readily separated from the electrode when the gas is generated. As verified from the experiment results described above, a level of stability of the electrode to which the hydrogel is applied may be relatively greater. Thus, it is verified that the linear M13 virus contributes to the stability of the metal electrode.

When applying the linear M13 virus, by integrating the M13 virus which is highly negatively charged in water to be highly hydrophilic into a surface of the electrode as a form of hydrogel, the hydrogel may hold water and have a high water affinity, and thus hydrophilicity of the electrode may increase. Thus, gas generated in the electrode may be more readily separated from the electrode. Based on a result that a current flowing in the surface is relatively higher, the electrode into which the hydrogel is integrated may separate a significant amount of gas therefrom, and may thus extend a gas reaction area or portion.

As described above, it is possible to form a 3D porous super-aerophobic layer by integrating, as hydrogel, an environmentally-friendly linear virus into a surface of a (photo) electrode, and increase an amount of gas being separated at an applied voltage and increase further an amount of gas to be generated. In addition, by forming the 3D porous super-aerophobic layer by the hydrogel itself instead of obtaining super-aerophobicity by an existing inorganic material-based electrode, it is possible to apply the 3D porous super-aerophobic layer to any electrode irrespective of type of electrode, minimize a concentration overpotential, maintain a maximum area for a gas generation or evolution reaction, and improve efficiency of the electrode by minimizing light scattering while maintaining physical and chemical properties of the electrode.

According to example embodiments described herein, there is provided an electrode including a super-aerophobic region formed with porous hydrogel in a 3D network structure by various types of polymer in addition to an environmentally-friendly linear virus such as M13 and the like on an electrode layer in which a gas generation or evolution reaction occurs. The transparent hydrogel in the super-aerophobic region may readily separate gas generated from a surface of the (photo)electrode to increase efficiency of the electrode and improve stability, in electrochemical or photoelectrochemical water splitting. The electrode may be super-aerophobic, and thus be applicable to reactions to generate various gas in addition to hydrogen and oxygen.

According to example embodiments described herein, there is provided a (photo) electrode that is stable with a change in physical and chemical structure being minimized and with an electrochemical activity not affected, by forming a hydrogel film through a simple coating process. Through the simple coating process, it is possible to increase an area of such a super-aerophobic electrode.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electrode for gas generation, comprising:
   a gas generating electrode layer; and
   a three-dimensional (3D) super-aerophobic layer comprising porous hydrogel formed on at least one portion of the gas generating electrode layer,
   wherein a surface of the at least one portion of the gas generating electrode layer is treated with alkoxy silane.

2. The electrode of claim 1, wherein the gas generating electrode layer includes:
   a transparent electrode layer or an opaque metallic electrode; and
   a catalytic material layer formed on the transparent electrode surface,
   wherein the catalytic material layer includes at least one catalyst selected from a group consisting of a metal, an oxide, a hydroxide, an oxyhydroxide, a nitride, an oxynitride, a carbide, a sulfide, a phosphide, a phosphate, and an alloy which include at least one selected from a group consisting of Pt, Ti, Sn, Zn, Mn, Mg, Ni, W, Co, Fe, Ba, In, Zr, Cu, Al, Bi, Pb, Ag, Cd, Ga, Y, Mo, Rh, Pd, Sb, Cs, La, V, Si, Al, Sr, B, and C.

3. The electrode of claim 1, wherein
   the gas generating electrode layer is a semiconductor substrate,
   wherein the semiconductor substrate is a substrate including a p-type or n-type semiconductor material layer, a silicon wafer, or a p-type or n-type semiconductor substrate.

4. The electrode of claim 1, wherein the 3D super-aerophobic layer including the porous hydrogel includes polymer-based hydrogel, linear virus-based hydrogel, or both the polymer-based hydrogel and the linear virus-based hydrogel.

5. The electrode of claim 4, wherein a linear virus of the linear virus-based hydrogel is M13.

6. The electrode of claim 1, wherein the porous hydrogel includes a cross-linked portion in which a polymer, a linear virus, or both the polymer and the linear virus, and a cross-linking agent are cross-linked,
   wherein the cross-linking agent includes at least one selected from a group consisting of glutaraldehyde, epichlorohydrin (EPC), piperazine diacrylamide, ethyl diethylaminopropyl carbodiimide (EDC), genepin, transglutaminase (TG), formaldehyde, N,N'-methylene-bis-acrylamide, N,N,N',N'-tetramethyl ethylene diamine, ethylene glycol dimethacrylate, glyoxal, acrylic acid, maleic acid (MA), polymaleic acid (PMA), succinic acid (SA), citric acid (CA), phosphoric acid (PA), tetraetoxysilane, boric acid (BA), and ether.

7. The electrode of claim 1, wherein the 3D super-aerophobic layer including the porous hydrogel is 5 micrometers ($\mu$m) to 500 $\mu$m thick.

8. The electrode of claim 1, being an electrode for generating hydrogen, oxygen, nitrogen, or chlorine by an electrochemical or photoelectrochemical decomposition reaction.

9. A device, comprising:
   an electrode for gas generation,
   wherein the electrode comprises:
   a gas generating electrode layer; and
   a three-dimensional (3D) super-aerophobic layer comprising porous hydrogel formed on at least one portion of the gas generating electrode layer,
   wherein the device is an electrochemical or photoelectrochemical water-splitting cell or fuel cell.

\* \* \* \* \*